June 5, 1945. F. M. PICKETT 2,377,514
COPYHOLDERS FOR DOCUMENT PHOTOGRAPHING CAMERAS
Filed May 3, 1943 4 Sheets-Sheet 1
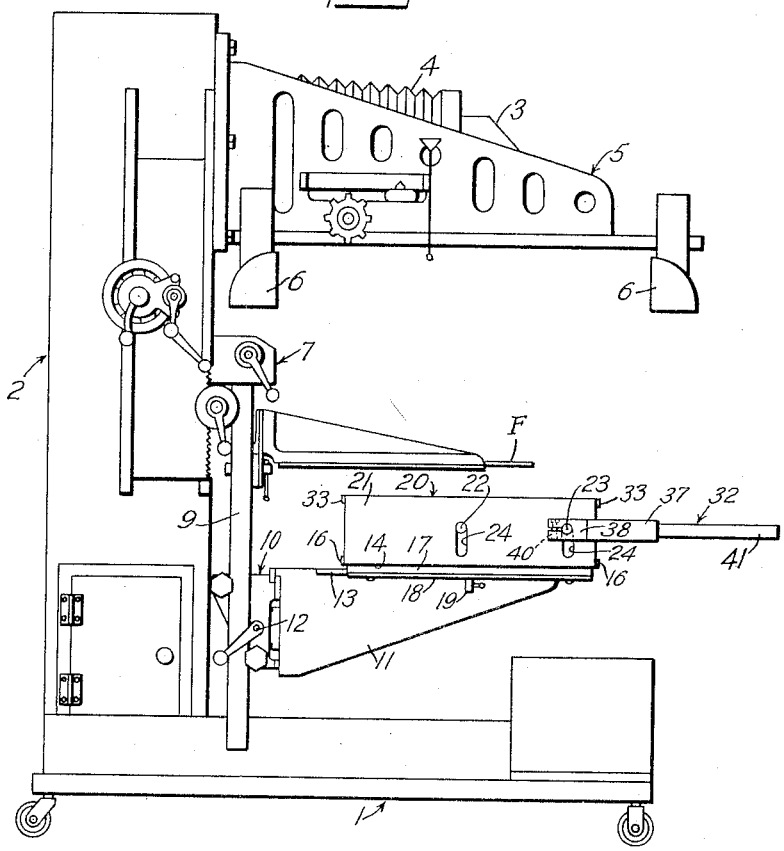
Fig.1
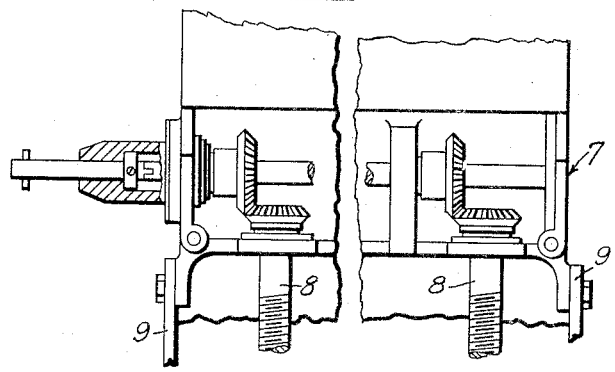
Fig.2
Inventor
FRANK M. PICKETT

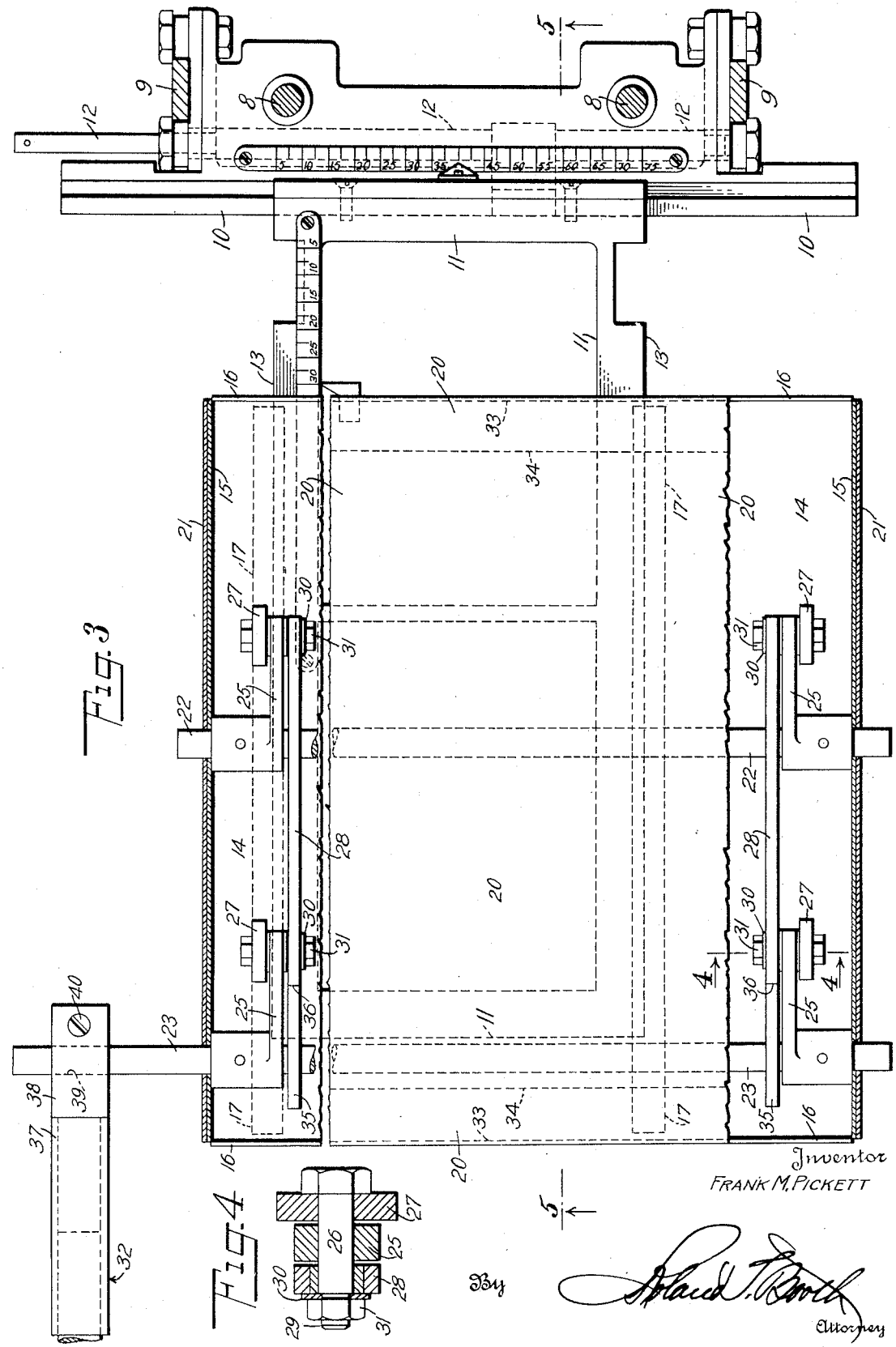

June 5, 1945. F. M. PICKETT 2,377,514
COPYHOLDERS FOR DOCUMENT PHOTOGRAPHING CAMERAS
Filed May 3, 1943 4 Sheets-Sheet 3

Inventor
FRANK M. PICKETT

June 5, 1945.   F. M. PICKETT   2,377,514
COPYHOLDERS FOR DOCUMENT PHOTOGRAPHING CAMERAS
Filed May 3, 1943   4 Sheets-Sheet 4
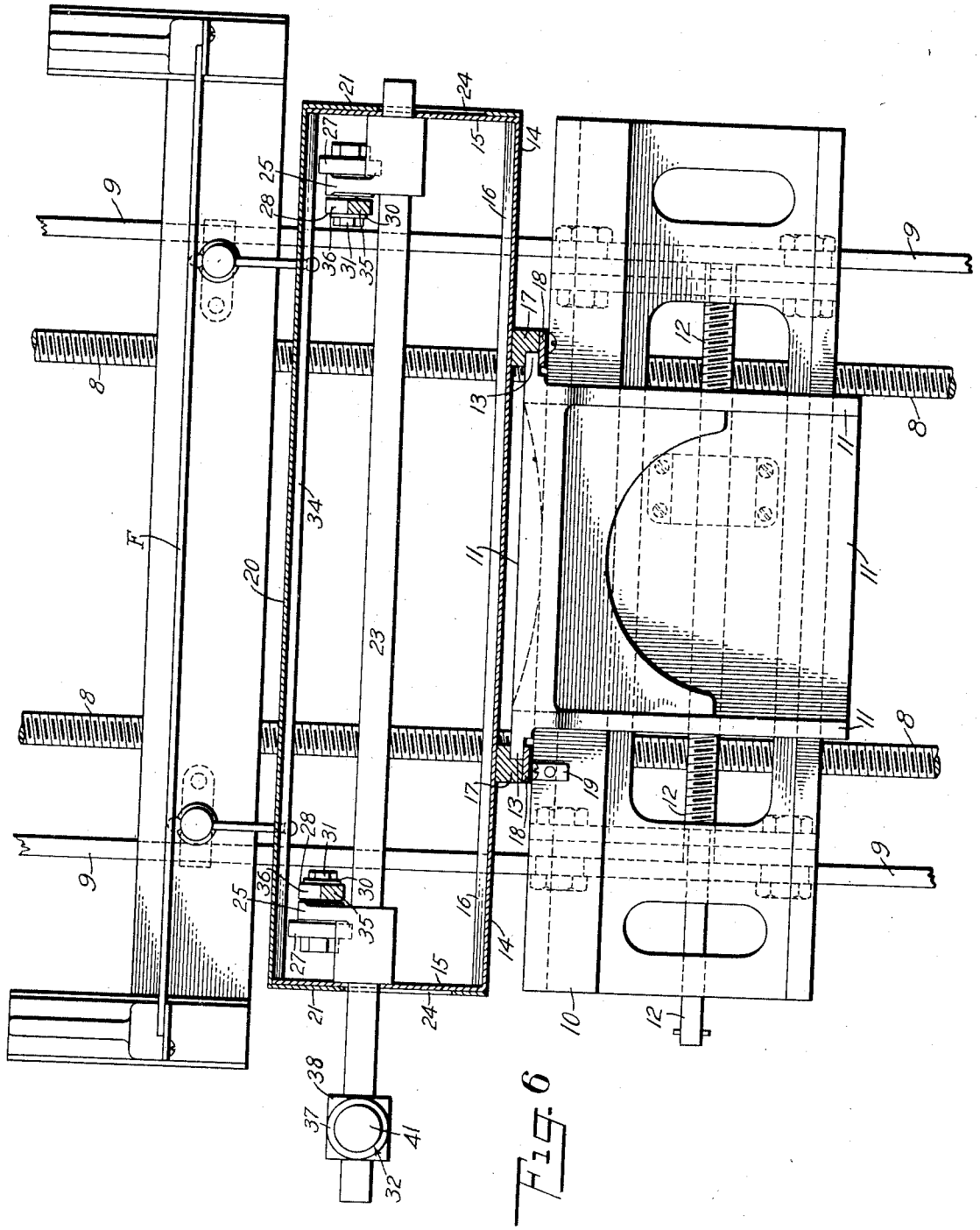
Inventor
FRANK M. PICKETT
By
Attorney Patented June 5, 1945

2,377,514

UNITED STATES PATENT OFFICE 2,377,514

COPYHOLDER FOR DOCUMENT PHOTOGRAPHING CAMERAS

Frank M. Pickett, Darien, Conn., assignor to Remington Rand Inc., Buffalo, N. Y., a corporation of Delaware Application May 3, 1943, Serial No. 485,422

3 Claims. (Cl. 88—24)

This invention relates to copyholders particularly adapted to support individual sheets, cards and books in position for making photographic copies of the printed matter thereon.

The invention comprehends improvements in the copyholder shown in Patent No. 2,282,768 patented May 12, 1942, by providing a copyholder of more simplified construction, that may be manufactured at reduced cost, and yet provide a copyholder that is efficient in operation and facilitates the photographic copying of book pages through convenient operation of the copy plate for the movement of the book being copied in a manner that turning of the pages of the book during the copying operation is improved, and made more convenient.

The invention provides a copy plate assembly that may be readily constructed from sheet metal with a copy plate and base plate having side flanges slidably engaged for guiding the copy and base plates for relative movement in parallel relation toward and from each other between two spaced positions and means housed between the copy and base plates manually operable to assist in obtaining the parallel movement of the plate. This assembly is arranged so it can be conveniently mounted on a supporting frame adjusted into a position for movement of the copy plate toward and from a focusing plate for convenient operation of the copy plate in having cards, sheets, books and the like positioned thereon for subsequent movement into engagement with the focusing plate for photographing.

The invention provides a copy plate assembly wherein a simple but efficient manually operable means is provided between the copy plate and the base plate for insuring uniform parallel movement of the copy plate relative to the base plate and the focusing plate in moving copies into and out of position for photographing.

The invention provides a copy plate assembly in the form of an assembled unit that can be readily attached and detached to a supporting frame adjustably mounted for movement in two directions on a camera so it may be positioned relative to a focusing plate also adjustably mounted on the camera for the copy plate to move documents into engagement with the focusing plate for photographing.

In the drawings:

Fig. 1 shows a document photographing machine in side elevation with the copyholder of this invention applied thereto.

Fig. 2 shows the operating mechanism for the main focusing screws, portions being broken away and the cover for the housing of this mechanism being omitted.

Fig. 3 is a plan view of the copyholder on an enlarged scale with portions broken away and shown in section to illustrate details of construction.

Fig. 4 is a cross section taken on line 4—4 of Fig. 3.

Fig. 6 is a cross section taken on line 6—6 of Fig. 5.

Figure 5:
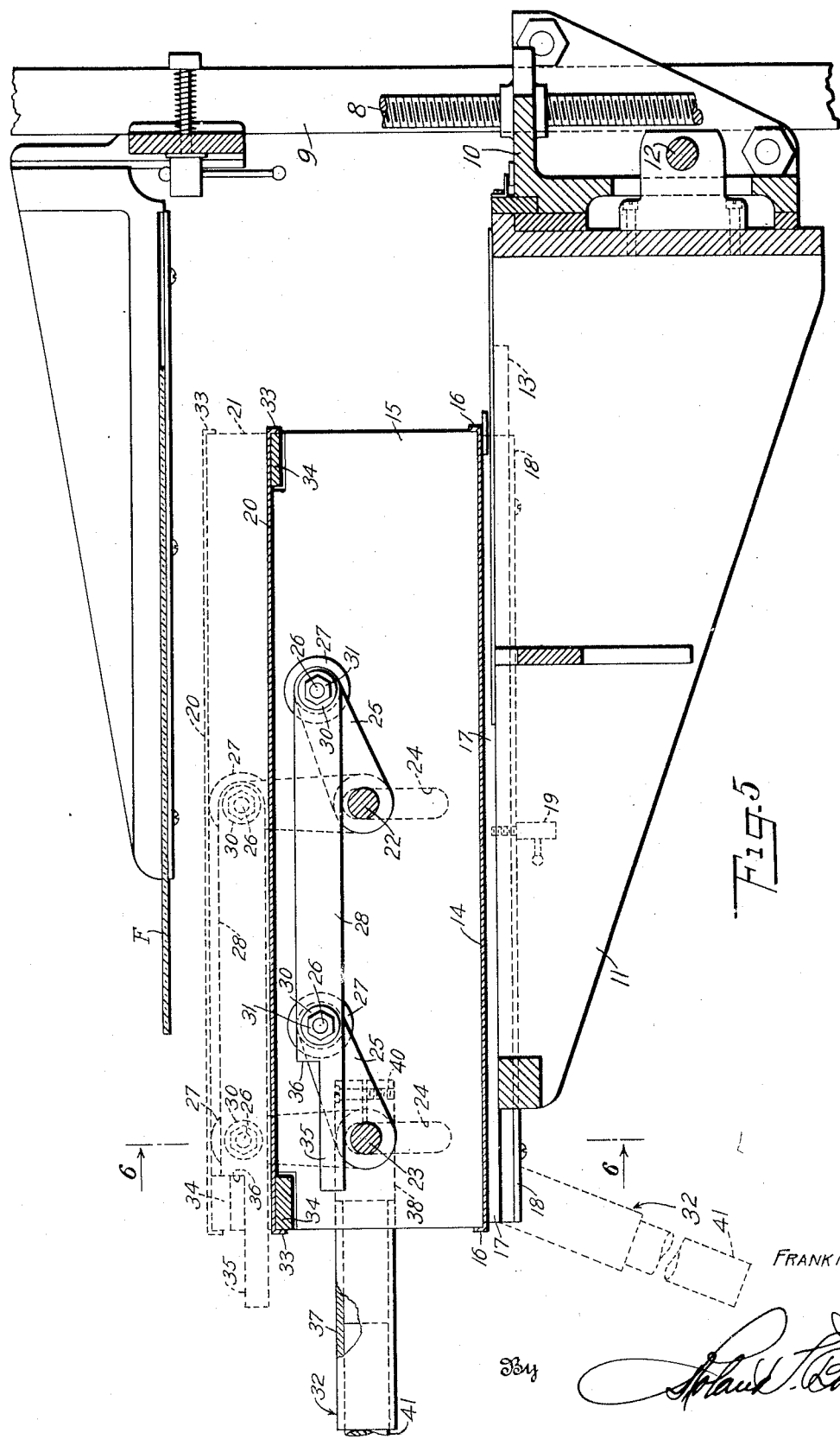
Fig. 5 is a vertical cross section taken on line 5—5 of Fig. 3.

The camera illustrated in Fig. 1 has a base 1 mounted on suitable casters carrying the entire camera structure including housing 2 for holding sensitized paper and feeding it in a desired manner for successively taking photographs of documents. The lens unit 3 is adjustably connected to housing 2 by bellows 4 and slidably mounted on a supporting structure generally indicated at 5. The lens unit is adjustable on structure 5 for movement into focus for making different sized reproductions of a document on the sensitized material in housing 2. The sizes vary in a known manner between the opposite limits of adjustment thereof. The housings for the lights to illuminate the copy to be photographed are indicated at 6.

A focusing screw supporting structure 7, Figs. 1 and 2, is mounted on housing 2 under supporting structure 5 a substantial distance above base 1. This structure has a pair of main focusing screws 8 and a pair of vertical tracks 9.

A focusing plate F of glass or other suitable transparent material is mounted in a suitable frame adjustably secured to vertical tracks 9.

A main carrier 10 is slidably mounted on vertical tracks 9 and engaged with focusing screws 8 so that in the rotation of the focusing screws the carrier is adjusted vertically on tracks 9. A supporting frame 11 is mounted for horizontal sliding movement on main carrier 10 so that it can be adjusted in a substantially horizontal plane back and forth across main carrier 10 through the operation of an adjusting screw 12 having a suitable handle for manual operation thereof. Supporting frame 11 has spaced side members formed at the upper horizontal edges with outwardly projecting guide flanges 13.

For a detailed description of the above described structure, reference may be had to the aforementioned Patent No. 2,282,768. It will be noted in referring to the aforementioned patent that supporting frame 11 as above described is constructed with guide members for engaging main carrier 10. This eliminates or combines the supplemental carrier of the aforementioned patent in such a manner, that the supporting frame and supplemental carrier of the patent are now a unitary construction adjustably mounted on the main carrier in horizontal relation eliminating the structure providing for vertical adjustment of the supporting frame as illustrated in said patent.

The present invention provides a copy plate assembly unit constructed for mounting on supporting frame 11. This unit has a bottom plate 14 formed of sheet metal provided with upstanding side flanges 15 on opposite sides thereof and flanges 16 extending laterally from the front and rear edges. A pair of rails 17 are mounted in spaced parallel relation on bottom plate 14 for engagement with guide flanges 13 on supporting frame 11. Retaining strips 18 also engage guide flanges 13 and are secured to rails 17 for cooperation therewith to slidably mount base plate 14 with the copy plate assembly on supporting frame 11 for slidable adjustment back and forth toward and from housing 2. A suitable screw clamp indicated at 19 is mounted on one of the rails 17 and constructed for operation to secure the copy plate assembly in desired position of adjustment on supporting frame 11 against sliding movement.

A copy plate 20 formed of sheet metal is mounted in spaced parallel relation above bottom plate 14 and supported thereon by depending flanges 21 at the side edges of copy plate 20 slidably engaging against the outside faces of upstanding side flanges 15 on bottom plate 14, in telescoping relation. A pair of shafts 22 and 23 respectively, are rotatably mounted in spaced parallel relation in openings in upstanding side flanges 15 and extend through vertical slots 24 in depending flanges 21 on the copy plate. These shafts thereby cooperate with the flanges to secure vertical sliding movement in substantially parallel relation of copy plate 20 relative to bottom plate 14 between two spaced positions. The movement of copy plate 20 is limited by the length of slots 24.

A pair of radially extending arms 25 are mounted on each of the shafts 22 and 23 respectively, with corresponding arms on shaft 22 aligned with the arms on shaft 23 as shown in Fig. 3. Arms 25 are rigidly secured on shafts 22 and 23 so as to rotate therewith. The free ends of arms 25 each have a bolt 26, see Figs. 3 and 4, extending through an opening therein rotatably mounting a roller 27 and pivotally securing one end of a link 28 thereto. A pair of links 28 are provided that connect the free ends of corresponding arms on shafts 22 and 23 in order that rotation of one of the shafts will be transmitted through the arms and links 28 to the other shaft to secure simultaneous uniform movement of all of the arms and the shafts. Bolt 26 has a reduced threaded end 29 for receiving a washer 30 and nut 31 threaded thereon for retaining washer 30 against the shoulder formed by reduced threaded end 29. This provides for the clearance necessary in mounting roller 27 and link 28 on each arm so that each is freely rotatable relative to the arm. One end of shaft 23 extends outwardly beyond one of the depending side walls 21, at one side of the copy plate, a substantial distance in order to provide for the mounting of a suitable handle 32 thereon for convenient manual engagement at the front end of the camera and copyholder for operation to rotate shaft 23.

The front and rear edges of copy plate 20 have depending flanges 33 formed thereon embracing cross bars 34 secured to the under faces of copy plate 20 and extending from side to side thereof between depending flanges 21.

The rear ends of links 28 are provided with extensions 35 and shoulders 36 that operate in the rotation of shafts 22 and 23 in one direction to be moved so that shoulders 36 will engage with the edge of one of cross bars 34 and limit the rotation of the shaft in the operation of arms 25 thereon to a position where arms 25 extend in a substantially vertical direction as shown in dotted lines in Fig. 5.

Handle 32 has a tubular member 37 at one end carrying a plug 38 provided with a transversely extending opening 39 for receiving shaft 23 and having the free end portion beyond said opening 39 bifurcated. A clamping screw 40 extends through the bifurcated end and is suitably threaded therein for drawing the bifurcations together in order to clamp plug 38 on shaft 23 against rotation thereon. The other part of handle 32 is formed of a suitable rod 41 having one end slidably engaged in tube 37. Rod 41 may be formed of a suitable length in order to obtain the desired manual operation for rotating shaft 23 and in turn shaft 22.

With the copyholder unit constructed as above described it will be understood that the copy plate and base plate when assembled with shafts 22 and 23 provide a unit that is retained in assembled relation by the shafts. The unit is adapted for ready mounting upon guide flanges 13 of supporting member 11 for slidable adjustment into a desired position with respect to the lens unit of the camera for making the desired photographic copies of printed matter. This copyholder structure is particularly adapted for use in photographing book pages. The books will be placed in the open position at the desired page on top of copy plate 20 with focusing plate F adjusted to the proper focusing position. Supporting frame 11 is then adjusted to the proper position for the subsequent operation of the copy plate assembly unit. Bottom plate 14 is then adjusted on guides 13 to position the book in the proper place for photographing and screw 19 is then tightened to lock this unit in adjusted position. Handle 32 is then operated to rotate shafts 22 and 23 which will cause arms 25 to move upwardly from the full line position illustrated in Fig. 5 toward the dotted line position. In this movement rollers 27 will engage the under face of copy plate 20 and through the parallel movement of arms 25 caused by links 28 rollers 27 will roll on the under face of copy plate 20 and move it upwardly in substantially parallel relation to focusing plate F until the book pages to be photographed are engaged with the under face of plate F whereupon the photographic reproduction may be made by operating the camera in the usual manner.

It will be noted that in moving copy plate 20 toward focusing plate F handle 32 is moved downwardly. After the photographs of of the book pages are taken, the handle is moved upwardly and copy plate 20 is withdrawn downwardly away from focusing plate F. When copy plate 20 has reached this lowered position as shown in full lines in Fig. 5, the book pages may then be conveniently turned to photograph other pages thereof in a convenient manner.

This copyholder structure may also be used for photographing printed matter on the faces of single sheets, cards and the like placed on top of copy plate 20 and moved into photographing position against the under face of focusing plate F through the operation of handle 32 for moving the copy plate toward focusing plate F until the object to be photographed is held in close contact with the focusing plate.

Shoulders 36 engage rear bar 34 to limit the upward movement of copy plate 20 to the position where arms 25 extend vertically thereby obtaining the maximum amount of movement of copy plate 20, considering the length of arms 25.

Bottom member 14 and copy plate 20 may be formed of sheet metal illustrated in a very convenient manner while the arm and link structure carried by shafts 22 and 23 use a most simple and expedient means for operating the copy plate between upper and lower limits of movement in parallel relation in cooperation with the guiding afforded by slots 24 in depending side portions 21 on the copy plate. This provides a structure that is substantially cheap to manufacture and readily assembled into a unit that is adjustably mounted in a convenient manner on the supporting frame. The provision of this unit also eliminates the structure for adjustably mounting the supporting frame on the secondary carrier of the aforementioned patent and provides a structure wherein the supporting frame can be directly mounted for horizontal adjustment on the main carrier structure.

The invention claimed is:

1. A copyholder for a document photographing camera wherein a base supports a housing, means is mounted on the base and housing adjustably supporting a focusing plate and a supporting frame is adjustably supported by said means for mounting a copy plate assembly, comprising a bottom plate having upstanding side flanges, a copy plate in spaced parallel relation to said bottom plate having depending side flanges slidably engaged in telescoping relation with the upstanding side flanges on said bottom plate, a pair of spaced parallel shafts extending through slots in the side flanges of one plate and rotatably mounted in the side flanges of the other plate, said slots being perpendicular to said plates, radially extending actuating arms on said shafts arranged in corresponding positions for engaging the first mentioned plate, a handle on one shaft for manual engagement to rotate said shaft, and means actuated in the rotation of said last-mentioned shaft for correspondingly rotating the other shaft whereby said shafts, arms, means and slots cooperate in manual operation of said handle to engage and move said copy plate between two spaced parallel positions relative to said bottom plate for moving a document to be copied into and out of engagement with said focusing plate.

2. A copyholder for a document photographing camera wherein a base supports a housing, means is mounted on the base and housing adjustably supporting a focusing plate and a supporting frame is adjustably supported by said means for mounting a copy plate assembly, comprising a bottom plate slidably mounted on said supporting frame, a copy plate, a pair of spaced parallel shafts rotatably mounted on said bottom plate, radially extending arms on said shafts for engaging and operating said copy plate, means connecting said arms for simultaneous operation in the same direction, interengaging parts on said copy and bottom plates cooperating with said shafts for slidably mounting said copy plate for vertical parallel movement relative to said bottom plate, and a handle for operating one shaft to move said arms and copy plate relative to said base for moving a document on said copy plate into and out of engagement with said focusing plate.

3. A copyholder for a document photographing camera wherein a base supports a housing, means is mounted on the base and housing adjustably supporting a focusing plate and a supporting frame is adjustably supported by said means for mounting a copy plate assembly comprising a bottom plate slidably mounted on said supporting frame, a copy plate, means mounting said copy plate on said bottom plate for lineal sliding movement in parallel relation to said bottom plate, a pair of spaced parallel shafts rotatably mounted on said bottom plate and interengaging with said means for cooperation in controlling said sliding movement of said copy plate, radially extending arms on said shafts for moving said copy plate, rollers mounted on the ends of said arms for engaging said copy plate, links pivotally connecting the arms on one shaft with the arms on the other to produce simultaneous movement of both shafts and the arms thereon in unison, and a handle on one shaft manually operable to move the rollers into engagement with the copy plate for moving the copy plate away from the base plate and toward the focusing plate for engaging a document to be copied with the focusing plate.

FRANK M. PICKETT.